De Heere et al.

3,653,307
[45] Apr. 4, 1972

[54] DEVICE FOR COMPENSATING CYLINDRICAL DISTORTION IN PANORAMIC AERIAL PHOTOGRAPHS

[72] Inventors: Gerard Andries Scheltema De Heere, Pijnacker; Rinze Veenenga Kingma, Delft, both of Netherlands

[73] Assignee: N.V. Optische Industrie de Oude Delft, Delft, Netherlands

[22] Filed: Aug. 25, 1969

[21] Appl. No.: 852,696

[30] Foreign Application Priority Data

Aug. 29, 1968  Netherlands..........................6812263

[52] U.S. Cl..................................................95/12.5, 95/15
[51] Int. Cl. ......................................................G03b 29/00
[58] Field of Search..........................95/11, 12.5, 15, 16, 17

[56] References Cited

UNITED STATES PATENTS 3,187,627  6/1965  Kapany..................................95/11 X

*Primary Examiner*—John M. Horan
*Attorney*—Arthur B. Colvin

[57] ABSTRACT

For compensating cylindrical distortion in panoramic aerial recordings an array of parallel light conducting fibers is used whose entrance surface is concave and circle-cylindrical, and whose exit surface has a convex cylindrical shape so calculated that the cylindrical distortion of a panoramic image focused on the entrance surface of the array, or of an original aerial photographic transparency placed on that surface, is compensated for the exit surface.

4 Claims, 3 Drawing Figures

Patented April 4, 1972

3,653,307

GERARD Andries Scheltema de Heere

Rinze Veenenga Kingma

INVENTORS

BY Arthur B. Colven

ATTORNEY

DEVICE FOR COMPENSATING CYLINDRICAL DISTORTION IN PANORAMIC AERIAL PHOTOGRAPHS

The invention relates to a device for compensating cylindrical distortion in panoramic aerial photographs.

In aerial photography efforts have been made more and more to increase the field angle transverse to the line of flight of the aircraft in order to minimize the number of flights necessary for photographing a certain area of the terrain.

By using vertically directed panoramic cameras it appears possible to make photographs covering a field angle of 2° × 60° or even more, as seen from the aircraft. Thus, by making a series of photographs which are contiguous in the flight direction a wide strip of the terrain can be recorded during one mission.

Similar efforts have also been made in the so-called aerial thermography in which a narrow strip of the terrain under the aircraft is periodically scanned in a direction transverse to the line of flight by a fast rotating scanner in order to pick-up long wave infrared radiation. This radiation, which is varying in intensity, is converted into an electric signal by a detector. This signal is fed to a photographic recording device, modulating a light source therein in response to the varying intensity of the detected infrared radiation. A light spot formed by this light source is periodically swept across a transversely curved photographic film which is transported lengthwise at a speed dependent on the velocity to altitude ratio $v/h$ of the aircraft. Thus, an image of the scanned area is built up from the successive lines on the photographic film and by increasing the scanning angle the scanned area can be made wider.

Wide field angle photographs show a distortion at the sides due to the rapidly increasing distance toward the object. This results in an increasing transverse image compression, called cylindrical distortion because the image is essentially a central projection of the scanned area on a cylindrically curved focal surface.

Various systems are already known for compensating this cylindrical distortion. They all have in common that an original photograph having this distortion is reproduced in a separate device so as to obtain a rectified copy. This process is time-consuming. Moreover, the known opto-mechanical devices for this purpose (rectifiers) have a rather complicated construction.

Accordingly, it is an object of the invention to provide a simple device for compensating cylindrical distortion, which device can also be combined with a recording device such as a panoramic camera, thus producing an original photograph which is free from cylindrical distortion.

According to the invention the device has a fiber optical array consisting of a large number of parallel light conducting fibers, optically insulated one from another, which array has an elongated active cross-section and two end surfaces having mutually parallel generatrices, one of the end-surfaces (the entrance surface) being concave and circle-cylindrical or arcuate, and the other end surface (the exit surface) being convex and complying with the formula:

$$\Delta u'_f = \frac{\Delta u_f}{\cos^2 \varphi} = \frac{r \Delta \varphi}{\cos^2 \varphi},$$

in which

- $r =$ the radius of curvature of the entrance surface;
- $\varphi =$ the scanning angle, that is the angle subtended by the arc in the entrance surface between the vertex of that surface and a point considered;
- $\Delta \varphi =$ a small variation in $\varphi$;
- $\Delta u_f =$ the line part in the entrance surface perpendicular to the generatrix and comprised in the angle $\Delta \varphi$;
- $\Delta u'_f =$ the corresponding line part in the exit surface, while, in addition, the device is provided with means for projecting the distorted image on the entrance surface of the fiber optical array and means for urging a photographic film against the exit surface.

Due to the special shape of the exit surface the image on the film has no cylindrical distortion, as will be shown hereinafter.

If the device is used for rectifying an original distorted film the latter is placed against the circle-cylindrical entrance surface and translucently illuminated. It is not necessary to move the film or any other mechanical or optical part of the device during the exposure.

It is very simple to combine the rectifier with a recording device, e.g. a panoramic camera or the recording part of an aerial thermographic system. For this purpose the fiber optical array is so arranged in the device that the entrance surface of this array coincides with the cylindrically curved focal surface of the recording device in which otherwise the photographic film would be positioned. However, now this film is fed along the exit surface of the fiber optical array. The latter conducts the light point by point from the original focal surface to the film which receives a distortion free image.

At present, the art of making fiber optical arrays is well-known, so that a detailed discussion on this subject need not be given herein. However, it may be mentioned that in the present device fibers can be used which are parallel to each other and have a uniform thickness. The process of fusing such fibers to compact plates having end surfaces which can be grinded and polished to the desired shape is much easier than with fibers which are not in parallel side-by-side relation or are tapering off.

It is well-known per se to compensate for or modify optical image curvatures by means of rotation symmetrical fiber optical arrays having parallel fibers. This is applied e.g. to the optical coupling of image intensifier tubes in which case the curvature of the anode screen of the first tube must be adapted to the differently curved photo-cathode of the second tube. It will be clear that this problem differs from the distortion problem underlying the present invention.

The first embodiment refers to the recording part of an aerial thermographic system as already briefly described hereinbefore. A more detailed description of such a system including the scanning part thereof can be read in the British Pat. No. 1,134,649.

The second embodiment relates to a well-known panoramic aerial camera as already described in the British Pat. No. 809,055.

Some embodiments of the invention will be described with reference to the accompanying drawings.

Figure 1:
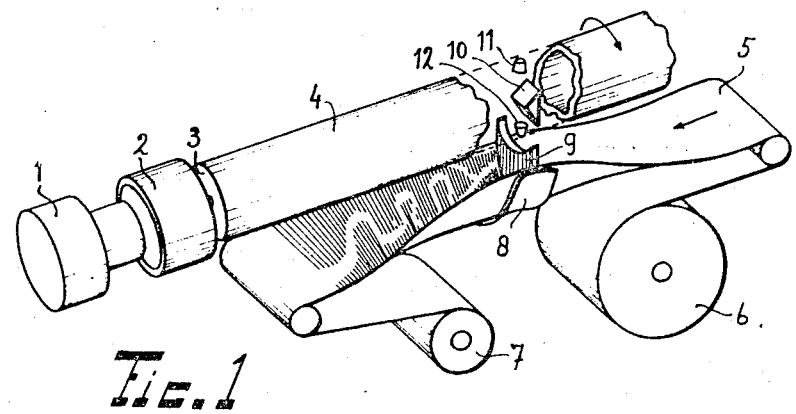
FIG. 1 is a perspective view of the recording part of an aerial thermographic system provided with a compensation device according to the invention.

The recording device according to FIG. 1 has an intensity modulated light source 1 directing a light beam to a diaphragm 3 via a condensor 2. The diaphragm is mounted on one end of a cylindrical tube 4 which is revolvable about its axis in synchronism with a rotating scanner (not-shown). By preference the tube is fixedly connected with the scanner. The film 5 to be exposed is fed from a supply reel 6 to a take-up reel 7. At the exposure station the film is transversely curved in conformity with a prescribed profile by a film guide 8, which leaves a narrow slit with the exit surface of a fiber optical array 9. This array will be discussed further on in the description. The film is continuously driven at a speed which, by preference, is proportional to the velocity to altitude ratio $v/h$ of the aircraft. Suitable means therefor are well-known in the art and are not shown here.

The film is exposed line by line by a pair of rotating light spots the intensity of which varies from point to point in response to the intensity of the detected infrared radiation. These extremely small light spots are obtained by forming two images of the diaphragm 3 in a circular path, concentric with the tube 4, via the two reflecting surfaces of a prism 10 and a pair of microscope objectives 11 and 12 which are mounted in the wall of the tube 4. Thus, in the described embodiment, the two light spots alternately take care of the exposure of one line.

The fiber optical array 9 consists of vertically parallel fibers of uniform cross-section and fused to form a compact plate. The cross-section of this plate is an elongated rectangle of which the smallest dimension is equal to the desired width of the image forming lines on the film. This dimension can comprise one as well as more fibers.

Figure 2:
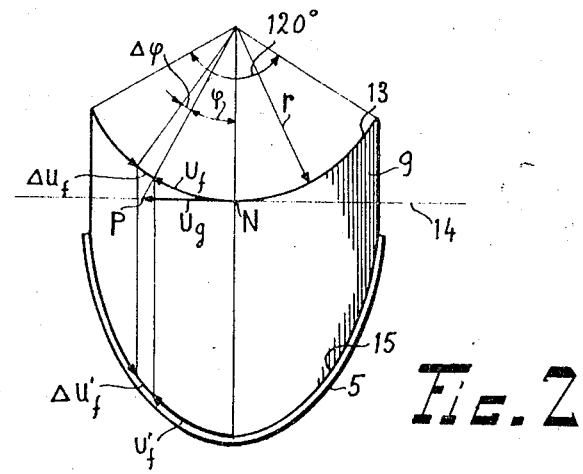
FIG. 2 is a schematic front view of the compensation device clarifying the principle thereof.

The upper end surface of the plate 9 is concave and polished to a circle-cylindrical or arcuate shape such that it coincides with the circular path of the light spots. Thus the top ends of the fibers will be scanned by these spots. The light, while maintaining the intensity pattern, is conducted by the fibers to the convex exit surface of the fiber array. This exit surface, unlike the entrance surface, is not arcuate but has been polished to a form such that the image registered on the film 5 is corrected for cylindrical distortion. To that end the convex shape of the cylindrical exit surface may be calculated in a manner to be discussed with reference to FIG. 2.

This figure is a front view of the fiber optical array. The circle-cylindrical entrance surface 13 has a radius of curvature $r$ and covers an arc of 120°. The horizontal plane 14 touching the entrance surface in the vertex N is similar to the ground, point N corresponding with the nadir point under the aircraft.

A point P in plane 14 at a scanning angle $\phi$, lies at a distance $u_g = r \tan\phi$ from N, but is reproduced in the entrance surface 13 at a distance $u_f = r\phi$. This difference which increases with $\phi$, is responsible for the cylindrical distortion.

A small increment $\Delta\phi$ of the scanning angle is reproduced in the focal surface 13 as $\Delta u_f = r\Delta\phi$. For distortion free reproduction, however, this should be given as:

$$\Delta u_g = \frac{r}{\cos^2\varphi} \Delta\varphi .$$

since the differential quotient
$$d\tan\phi/d\phi = 1/\cos^2\phi .$$

If therefore the exit surface 15 of the fiber optical array is so shaped that for each point P a small increment $\Delta\phi$ of the scanning angle results in a deflection $\Delta u'_f$ in that surface equal to $\Delta u_g$, or $$\Delta u'_f = \frac{\Delta u_f}{\cos^2\varphi} = \frac{r \cdot \Delta\varphi}{\cos^2\varphi},$$

then for each point the total distance $u'_f$ will be equal to $u_g$, and the picture on film 5 will be distortion free.

The shape of the exit surface can easily be calculated numerically by increasing the angle $\phi$ in sufficiently small steps $\Delta\phi$, for example of 1° each, and calculating each time the coordinates of the next point of the curve by means of the formula.

Figure 3:
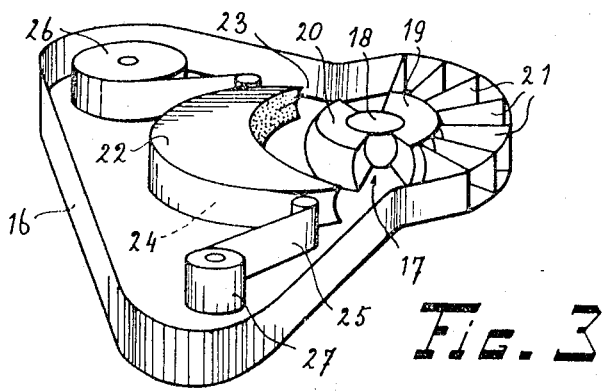
FIG. 3 is a perspective view of a panoramic camera combined with the compensation device.

FIG. 3 shows a panoramic camera of generally known type, with the upper side of the housing removed in order to show the interior parts. The objective 17 is a so-called concentric system consisting of a central lens 18 and two spherical shell parts 19 and 20 cemented to the lens 18. The panoramic focal surface of this system is also spherical and concentric with the objective. In this figure the light beams, which are limited in aperture by a number of radial blades 21, are entering the objective on the right. Behind the objective a fiber optical array is mounted, of which the entrance surface coincides with the focal surface of the objective. This entrance surface is not exactly cylindrical in this case since it has in all directions the same radius of curvature. If desired, the image can be made exactly cylindrical by applying a torical field flattening lens, as described in the British Pat. No. 809,055. This has no influence on the action of the fiber optical array as a rectifier of cylindrical distortion.

The fiber optical array has an elongated rectangular cross-section of which the smallest dimension is determined by the field angle of the camera perpendicular to the panoramic plane. It will be noticed that in action the camera is mounted such, that the panoramic plane is vertical and transverse to the course of flight.

Against the cylindrical exit surface 24 of the fiber optical array of which the shape may be calculated in the same way as described hereabove, the film 25 is held. After each exposure this film is advanced one frame from the supply reel to the take-up reel. During the exposure the objective and the film do not move; the exposure is accomplished by removing temporarily a shutter (not-shown) from the light path between the focal plane 23 and the objective.

Due to the different angles at which the fibers in the outer edge portions of the panoramic field are cut at both end surfaces, some vignetting will appear, for the illumination on the film will gradually decrease toward the edges as a result of the distribution of the available light per image element over an increasing exit area.

In the case of the recording device according to FIG. 1 this vignetting can be partly or completely compensated for by modulating in any well-known way the current of the light source 1, dependent on the scanning angle $\phi$.

What we claim is:

1. A device for compensating cylindrical distortion in panoramic aerial recordings comprising a fiber optical array consisting of a large number of parallel light conducting fibers optically insulated one from another, which array has an elongated active cross-section and end surfaces having mutually parallel generatrices, one of the end surfaces (the entrance surface) being concave and arcuate and the other end surface (the exit surface) being convex and complying with the formula:

$$\Delta u'_f = \frac{\Delta u_f}{\cos^2\varphi} = \frac{r\Delta\varphi}{\cos^2\varphi}$$

in which $r =$ the radius of curvature of the entrance surface;
$\phi =$ the scanning angle, this is the angle subtended by the arc in the entrance surface between the vertex of that surface and a point considered;
$\Delta\phi =$ a small variation in $\phi$;
$\Delta u_f =$ the line part in the entrance surface perpendicular to the generatrix and comprised in the angle $\Delta\phi$;
$\Delta u'_f =$ the corresponding line part in the exit surface, while, in addition, the device is provided with means for projecting a distorted image on the entrance surface of the fiber optical array and means for urging a photographic film against the exit surface.

2. A panoramic camera comprising the device of claim 1, and having the fiber optical array so arranged that its entrance surface coincides with the focal surface of the camera objective.

3. The combination set forth in claim 1 comprising a scanning device for picking up infra-red radiation from a scene beneath an aeroplane, a light source, means to form a light spot from the light source, means to detect the infra-red radiation and to provide an electric output signal which modulates said light source in accordance with the intensity of the radiation detected and means to move the modulated light spot in a circular path and to project said light spot onto the entrance surface of said fiber optical array.

4. A system as set forth in claim 3 comprising means to intensity modulate the light spot as a function of the scanning angle $\phi$, whereby vignetting which appears as a result of the different angles at which the fibers are cut at both end surfaces, is completely or partly compensated for.

* * * * *